United States Patent
Pinto et al.

(10) Patent No.: US 12,210,470 B2
(45) Date of Patent: Jan. 28, 2025

(54) SYSTEMS, METHODS, AND APPARATUS TO IDENTIFY FUNCTIONS FOR COMPUTATIONAL DEVICES

(71) Applicant: Samsung Electronics Co., Ltd., Suwon-si (KR)

(72) Inventors: Oscar P. Pinto, San Jose, CA (US); William Martin, Roseville, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/730,174

(22) Filed: Apr. 26, 2022

(65) Prior Publication Data

US 2023/0039450 A1 Feb. 9, 2023

Related U.S. Application Data

(60) Provisional application No. 63/319,268, filed on Mar. 11, 2022, provisional application No. 63/229,069, filed on Aug. 3, 2021.

(51) Int. Cl.

| | |
|---|---|
| *G06F 13/38* | (2006.01) |
| *G06F 9/50* | (2006.01) |
| *G06F 9/54* | (2006.01) |
| *G06F 12/06* | (2006.01) |
| *G06F 13/14* | (2006.01) |

(52) U.S. Cl.
CPC ............ *G06F 13/385* (2013.01); *G06F 9/547* (2013.01)

(58) Field of Classification Search
CPC .............................. G06Q 20/26; H04M 1/2757
See application file for complete search history.

(56) References Cited

U.S. PATENT DOCUMENTS

| | | |
|---|---|---|
| 9,294,567 B2 | 3/2016 | Hussain et al. |
| 9,430,412 B2 | 8/2016 | Huang |
| 10,095,537 B1 | 10/2018 | Neogy et al. |
| 10,496,335 B2 | 12/2019 | Khan et al. |

(Continued)

OTHER PUBLICATIONS

European Extended Search Report for Application No. 22188091.7, mailed Dec. 19, 2022.

(Continued)

*Primary Examiner* — Getente A Yimer
(74) *Attorney, Agent, or Firm* — Renaissance IP Law Group LLP

(57) ABSTRACT

A method may include interacting with an interface for one or more computational devices, wherein the interacting is based on an identifier, and wherein the identifier comprises information that identifies a functionality of a computational device functions. The information may include a functionality identifier. The identifier may further include information that identifies a group of the computational device function. The group of the computational device function may be based on a source of the computational device function. The information that identifies the functionality of a computational device function may include a functionality identifier, and the information that identifies the group of the computational device function may include a group identifier. The functionality identifier may include a unique function identifier, and the group identifier may include an organizationally unique identifier.

20 Claims, 5 Drawing Sheets

(56) References Cited

U.S. PATENT DOCUMENTS

| | | |
|---|---|---|
| 10,996,892 B2 | 5/2021 | Gibb et al. |
| 11,086,804 B2 | 8/2021 | Benisty et al. |
| 11,631,297 B1* | 4/2023 | Nguyen ................ G07F 17/323 463/31 |
| 11,636,732 B2* | 4/2023 | Nguyen .............. G07F 17/3237 463/25 |
| 11,770,756 B2* | 9/2023 | Karabinis ............. H04W 4/023 455/456.3 |
| 11,983,989 B2 | 5/2024 | Nguyen et al. |
| 2007/0265984 A1* | 11/2007 | Santhana ............... G06Q 20/26 705/65 |
| 2008/0176713 A1* | 7/2008 | Olivera Brizzio ..... A63B 24/00 482/8 |
| 2014/0089643 A1 | 3/2014 | Nishimoto et al. |
| 2016/0226732 A1 | 8/2016 | Kim et al. |
| 2018/0063145 A1 | 3/2018 | Cayton et al. |
| 2019/0173989 A1* | 6/2019 | Elmasri ............... H04M 1/2757 |

OTHER PUBLICATIONS

Malone, Kim et al., "NVMe Computation Storage Standardizing Offload of Computation via NVMe", Storage Developer Conference, Virtual Conference, 2021, 24 pages.

NVM Express, Inc. "NVM Express Base Specification Revision 1.4," 2019, 403 pages.

NVM Express, Inc. "NVM Express Base Specification Revision 1.4a," 2020, 400 pages.

Office Action for U.S. Appl. No. 18/218,577, mailed Dec. 2, 2024.

\* cited by examiner

SYSTEMS, METHODS, AND APPARATUS TO IDENTIFY FUNCTIONS FOR COMPUTATIONAL DEVICES

REFERENCE TO RELATED APPLICATION

This application claims priority to, and the benefit of, U.S. Provisional Patent Application Ser. No. 63/319,268 titled "Systems, Methods, And Apparatus For Identifying Algorithmic Functions For Programs" filed Mar. 11, 2022, and U.S. Provisional Patent Application Ser. No. 63/229,069 titled "Mechanisms To Identify Algorithmic Functions For Programs" filed Aug. 3, 2021 both of which are incorporated by reference.

TECHNICAL FIELD

This disclosure relates generally to computational devices, and more specifically to systems, methods, and apparatus to identify functions for computational devices.

BACKGROUND

A computational device such as an accelerator or a computational storage device may Implement one or more functions that may perform operations on data. A host may offload a processing task to the computational device by invoking a function that may be implemented by the device. The computational device may perform the function, for example, using one or more compute resources.

The above information disclosed in this Background section is only for enhancement of understanding of the background of the inventive principles and therefore it may contain information that does not constitute prior art.

SUMMARY

A method may include interacting with an interface for one or more computational devices, wherein the interacting is based on an identifier, and wherein the identifier comprises information that identifies a functionality of a computational device function. The information may include a functionality identifier. The identifier may further include information that identifies a group of the computational device function. The group of the computational device function may be based on a source of the computational device function. The information that identifies the functionality of a computational device function may include a functionality identifier, and the information that identifies the group of the computational device function may include a group identifier. The functionality identifier may include a unique function identifier, and the group identifier may include an organizationally unique identifier. The identifier may be a first identifier, the information may be first information, the functionality may be a first functionality, the computational device function may be a first computational device function, the functionality identifier may be a first functionality identifier, and the group identifier may be a first group identifier, and the interacting may be based on a second identifier, wherein the second identifier may include second information that identifies a second functionality of a second computational device function, and the second information may include a second functionality identifier and a second group identifier. The first functionality identifier may be the same as the second functionality identifier, the first group identifier may be different from the second group identifier, and the first functionality may be interoperable with the second functionality. The first functionality identifier and the second functionality identifier may be in a first range. The first functionality identifier may be the same as the second functionality identifier, the first group identifier may be different from the second group identifier, and the first functionality may be different from the second functionality. The first functionality identifier may be in a first range and the second functionality may be in a second range. The interacting may include requesting requested information using the interface. The method may further include providing, by the interface, based on the requesting, the requested information. The requested information may include an indication that one or more of the one or more computational devices support the computational device function. The indication may include a list of computational devices that support the computational device function. The requested information may include a list of computational device functions supported by at least one of the one or more computational devices. The list may include the identifier. The requested information may include a format of the computational device function. The format may include one or more parameters. The one or more parameters may include one or more of an input parameter, an output parameter, or a status. The requested information may be requested by an application. The requesting may include invoking an interface call. The interacting may include accessing, based on the identifier, using the interface, the computational device function. The accessing may include configuring the computational device function. The accessing may include executing the computational device function. The accessing may include receiving, from the interface, a handle for the computational device function, and the executing may include invoking, using the handle, the computational device function.

A device may include one or more computational resources configured to perform a computational device function, and at least one processor configured to access, based on an identifier, the computational device function, wherein the identifier may include information that identifies a functionality of the computational device function. The identifier may further include information that identifies a group of the computational device function. The at least one processor may be configured to send, based on a request, the identifier. The identifier may be a first identifier, the computational device function may be a first computational device function, and wherein the one or more computational resources may be configured to perform a second computational device function, and the at least one processor may be configured to access, based on a second identifier, the second computational device function, wherein the second identifier may include information that identifies a second functionality of the second computational device function, and send, based on the request, the second identifier. The at least one processor may be configured to send, based on a request comprising the identifier, an indication that the device supports the computational device function. The at least one processor may be configured to configure, based on a request, the computational device function. The at least one processor may be configured to invoke, based on a request, using the one or more computational resources, the computational device function. The at least one processor may be configured to provide an output from the computational device function. The at least one processor may be configured to provide an interface to the computational device function. The device may include a computational storage device.

A system may include an apparatus comprising at least one processor configured to provide an interface for one or more computational devices, wherein the interface may be configured to perform at least one operation based on an identifier, and wherein the identifier may include information that identifies a functionality of a computational device function. The identifier may include information that identifies a group of the computational device function. The at least one processor may be configured to perform a determination, based on the identifier, of a location of the computational device function in the system. The at least one processor may be configured to provide, using the interface, the location of the computational device function. The apparatus may be configured to execute an application configured to interact with the interface. The apparatus may include a host, the system further comprising one or more computational devices in communication with the host. At least one of the one or more computational devices may be configured to perform the computational device function. The interface may be configured to access, based on the identifier, the computational device function. The interface may be configured to invoke, based on the identifier, the computational device function.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
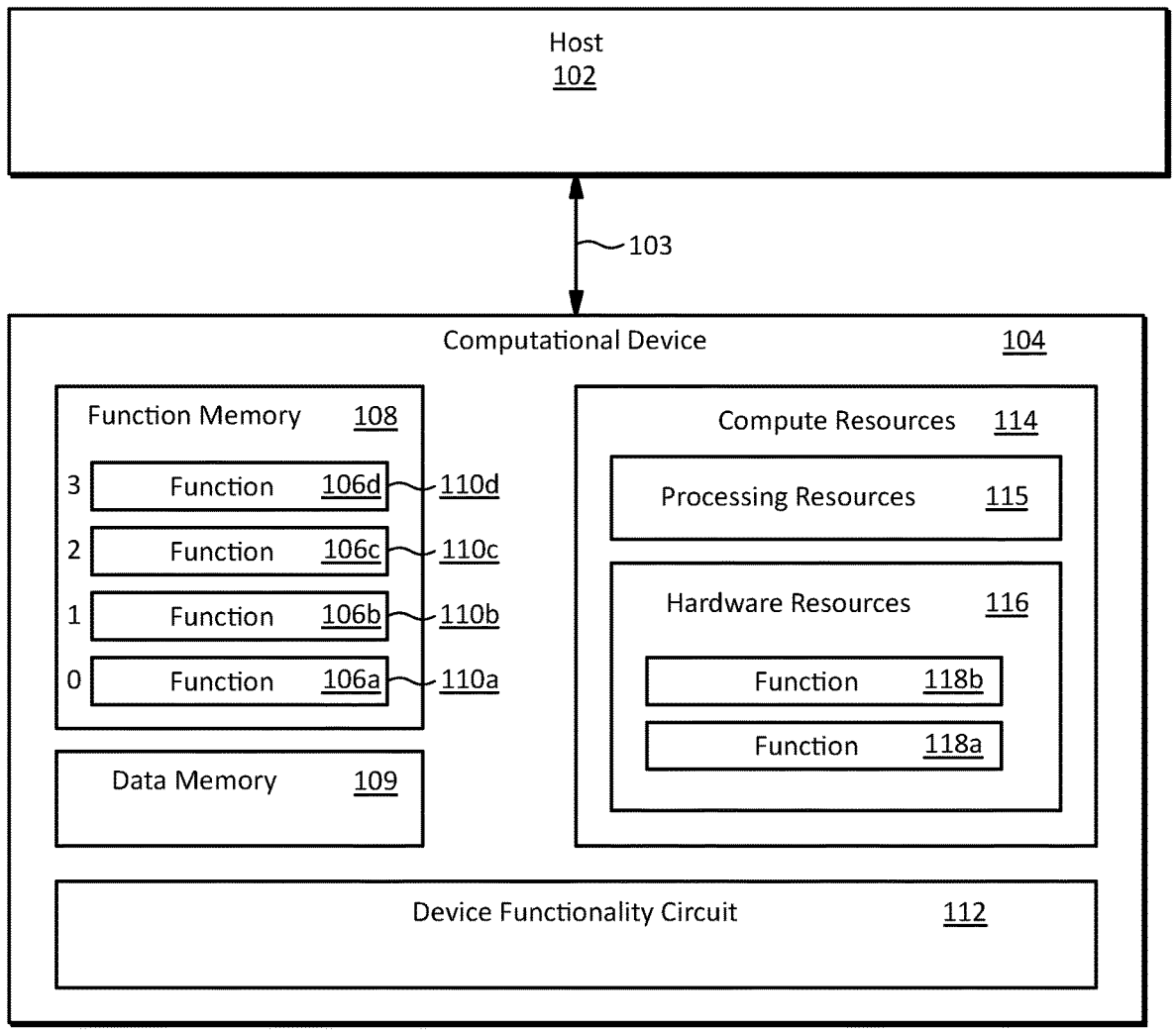
FIG. 1 illustrates an embodiment of a scheme for implementing one or more computational device functions at a computational device in accordance with example embodiments of the disclosure.

Computational devices such as accelerators, computational storage devices, and/or the like, may implement one or more functions that may be used, for example, to offload processing tasks from a host. Computational devices from different sources may implement the same or similar functions, but using different implementation details such as function definitions, parameters, and/or the like. Thus, computational devices from different sources may not provide interoperable functions.

A function identification scheme in accordance with example embodiments of the disclosure may enable interoperability of computational device functions across different device implementations, sources, and/or the like. For example, in some embodiments, a function identifier may include a functionality identifier that may indicate a functionality (e.g., an algorithm and/or other type of behavior) of a computational device function. Depending on the implementation details, two different computational devices (e.g., from different sources) may use the same functionality identifier to identify their two respective implementations of a computational device function that may be interoperable (e.g., may be interchangeable, may provide the same or similar outputs in response to the same or similar inputs, and/or the like).

In some embodiments, a function identifier may also include a group identifier that may indicate a group to which the computational device function may belong. In some embodiments, a group may refer to a logical group, a group related to an organization, and/or the like. Thus, in some embodiments, a function identifier for a computational device function may have two portions: a functionality identifier that may identify a functionality of the function (e.g., algorithm or other behavior implemented by the function) and a group identifier that may indicate a group to which the function may belong (e.g., a group of functions created by a source of the function). Depending on the implementation details, such a function identifier may enable an application, a host, a device, and/or the like, to advertise, discover, and/or access (e.g., configure, execute, and/or the like) computational device functions in a consistent manner.

In some embodiments, one or more of the techniques disclosed herein may be implemented with an interface (which may also be referred to as a function interface) that may be implemented, for example, in a manner similar to an application programming interface (API). In some embodiments, such an interface may enable an application, a host, a device, and/or the like, to advertise, discover and/or access a computational device function by invoking an interface call using a function identifier for the computational device function.

For purposes of illustration, some embodiments may be described in the context of computational storage devices. However, the principles are not limited to storage devices and may be applied to any computational devices that may implement one or more computational device functions. In some embodiments, any function that may be implemented by a computational device may be referred to as a computational device function. In some embodiments, interoperable and interoperability may refer to interchangeable and interchangeability, respectively.

FIG. 1 illustrates an embodiment of a scheme for implementing one or more computational device functions at a computational device in accordance with example embodiments of the disclosure. The embodiment illustrated in FIG. 1 may include a host 102, and a computational device 104 connected by a communication fabric 103. In some embodiments, the host 102 may offload one or more tasks to one or more computational device functions implemented by the computational device 102.

The computational device 104 may include a function memory area 108, a data memory 109, one or more compute resources 114, and/or a device functionality circuit 112. The device functionality circuit 112 may include any hardware to implement the primary function of the computational device 104. For example, if the computational device 104 is implemented as a storage device, the device functionality circuit 112 may include a storage medium such as one or more flash memory devices, a flash translation layer (FTL), and/or the like. In some embodiments, a computational storage device may be implemented as a computational storage drive (CSD), a computational storage processor (CSP), and/or a computational storage array (CSA).

As another example, if the computational device 104 is implemented as a network interface card (NIC), the device functionality circuit 112 may include one or more modems, network interfaces, physical layers (PHYs), medium access control layers (MACs), and/or the like. As a further example, if the computational device 104 is implemented as an accelerator, the device functionality circuit 112 may include one or more compute resources such as field programmable gate arranges (FPGAs), application specific integrated circuits (ASICs), embedded processors, and/or the like.

The host 102 may be implemented with any component or combination of components that may utilize the computational resources 114 of the computational device 104. For example, the host 102 may include one or more of a client device, a server, a storage node, a central processing unit (CPU), a personal computer, a tablet computer, a smartphone, and/or the like. Moreover, the embodiment illustrated in FIG. 1 may include any number of hosts. In some embodiments, the host 102 may be implemented as one or more computational device functions, e.g., on the same computational device 104. For example, one computational device function may call another computational function, e.g., that may be advertised by the computational device. In some embodiments, a host may refer to anything (e.g., hardware, software or combination thereof, that may avail itself of the computational device functionality described herein.

The communication fabric 103 may be implemented with one or more interconnects, one or more networks, a network of networks (e.g., the internet), and/or the like, or a combination thereof, using any type of interface and/or protocol. For example, the fabric 103 may be implemented with Peripheral Component Interconnect Express (PCIe), Non-volatile Memory Express (NVMe), NVMe-over-fabric (NVMe-oF), Ethernet, Transmission Control Protocol/Internet Protocol (TCP/IP), Direct Memory Access (DMA) Remote DMA (RDMA), RDMA over Converged Ethernet (ROCE), FibreChannel, InfiniBand, Serial ATA (SATA), Small Computer Systems Interface (SCSI), Serial Attached SCSI (SAS), iWARP, and/or the like, or any combination thereof. For example, in an embodiment in which the computational device 104 is implemented as a storage device, a storage protocol such as NVMe that may be used to enable the host 102 and the computational device 104 to exchange commands, data, and/or the like, over the communication fabric 103. In some embodiments, the communication fabric 103 may include one or more switches, hubs, nodes, routers, and/or the like.

The memory area 108 may include one or more function slots 110 (in this example, four function slots 110a-110d) for storing one or more executable computational device functions 106 (in this example, for functions 106a-106d). The one or more executable computational device functions 106 (e.g., software implemented functions) may be executed, for example, using one or more processing resources 115 of the compute resources 114. For example, in some embodiments, the processing resources 115 may include one or more embedded processors (e.g., CPUs such as complex instruction set computer (CISC) processors such as x86 processors and/or reduced instruction set computer (RISC) processors such as ARM processors), ASICs, FPGAs, graphics processing units (GPUs), neural processing units (NPUs), tensor processing units (TPUs), and/or the like, executing instructions that may implement one or more of the executable computational device functions 106. In some embodiments, one or more of the compute resources 114 may execute one or more of the executable computational device functions 106 in an execution environment such as a container, a virtual machine, an Extended Berkeley Packet Filter (eBPF) environment, and/or the like, or a combination thereof.

In some embodiments, the data memory 109 may be used by one or more of the computational device functions 106 when being executed with one or more of the compute resources 114. For example, the data memory 109 may be used to hold input data, output data, transitional data, and/or the like, for one or more of the computational device functions 106.

In some embodiments, the compute resources 114 may include one or more hardware resources 116 that may provide full or partial hardware implementations of one or more computational device functions 118 (in this example, computational device functions 118a and 118b). For example, in some embodiments, the hardware resources 116 may include combinational logic, sequential logic, one or more timers, counters, registers, and/or state machines, one or more complex programmable logic devices (CPLDs), FPGAs, ASICs, and/or a combination thereof.

In some embodiments, the compute resources 114 may implement one or more computational device functions using a hybrid combination of software implementation (e.g., using one or more of the processing resources 115) and hardware implementation (e.g., using one or more of the hardware resources 116). In some embodiments, one or more of the executable computational device functions 106 may be downloaded, for example, from the host 102 and/or any other source. In some embodiments, one or more of the executable computational device functions 106 may be loaded into the device 104 when is it manufactured, shipped, installed, updated and/or upgraded (e.g., through a firmware updated and/or upgrade) and/or the like. In some embodiments, a function may be referred to as a program, for example, in the context of executable computational device functions 106 that may be downloaded.

In some embodiments, a computational device function may refer to any type of function that may be performed by one or more compute resources of a computational device such as an algorithm, data movement, data management, data selection, filtering, encryption and/or decryption, compression and/or decompression, checksum calculation, hash value calculation, cyclic redundancy check (CRC), and/or the like. In some embodiments, executing a computational device function may be referred to as command processing or computational command processing. In some embodiments, a computational device function may refer to a function that may be intended to be executed by a computational device, adapted to be executed by a computational device, and/or the like. In some embodiments, even though a computational device function may be intended to be executed by a computational device, the computational device function may be executed by a host, a node, and/or the like in a system, for example, as a fallback provision if no computational device that is capable of executing the function is present, available, and/or the like, in the system.

In some embodiments, a function identification scheme in accordance with the disclosure may be applied to the system illustrated in FIG. 1 to enable interoperability of the computational device functions 106 and 118 across different device implementations, device sources, and/or the like.

Figure 2:
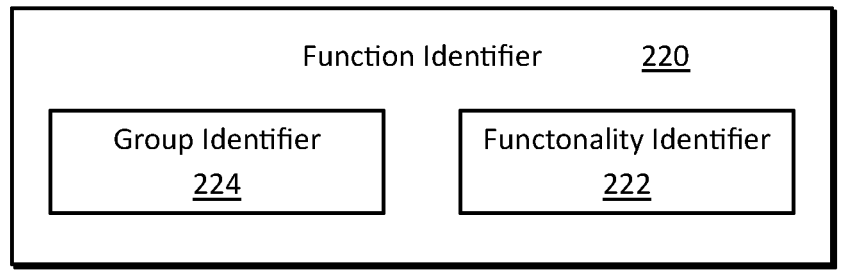
FIG. 2 illustrates an embodiment of an identification scheme for computational device functions in accordance with example embodiments of the disclosure.

FIG. 2 illustrates an embodiment of an identification scheme for computational device functions in accordance with example embodiments of the disclosure. In the embodiment illustrated in FIG. 2, a function identifier 220 may be used to identify a computational device function (which may also be referred to as a function) that may be implemented, for example, by a computational device such as the computational device 104 illustrated in FIG. 1. However, neither of the embodiments illustrated in FIG. 1 or FIG. 2 are limited to any of the implementation details disclosed therein.

Referring to FIG. 2, the function identifier 220 may include first information 222 that may identify one or more functionalities of the computational device function, and second information 224 that may identify one or more groups to which the computational device function may belong. In some embodiments, either or both of the first information 222 and the second information 224 may be represented in any manner including digital representations, analog representations, alpha-numeric representations, and/or the like.

For purposes of illustration, the first information 222 and the second information 224 are illustrated as separate elements in FIG. 2, but in some embodiments, some or all of the first information 222 and/or the second information 224 may be combined, for example, using encoding, hashes, and/or the like in a manner that may enable some or all of the first information 222 and/or the second information 224 to be determined for use in an identification scheme in accordance with example embodiments of the disclosure.

In some embodiments, the first information 222 may be implemented with a functionality identifier (e.g., a fixed or variable length numeric code) that may identify a functionality of a computational device function. A functionality may refer to any type of behavior, expected results, and/or the like. Examples of a functionality may include an algorithm, data movement, data management, data selection, filtering, encryption and/or decryption, compression and/or decompression, checksum calculation, hash value calculation, CRC calculation, and/or the like.

Depending on the implementation details, two different computational devices (e.g., devices from different sources) having the same functionality identifier may implement computational device functions that are interoperable. In some embodiments, computational device functions may be considered interoperable if, in response to the same inputs, the computational device functions provide results that are the same or similar enough to enable the computational device function of one of the devices to be interchanged with the computational device function of the other device.

In some embodiments, the second information 224 may be implemented with a group identifier (e.g., a fixed or variable length numeric code) that may indicate a group to which the computational device function may belong. In some embodiments, a group may refer to a logical group, a group related to an organization, and/or the like. Examples of logical groups may include a global or universal group of functions, a default group of functions, and/or the like. Examples of groups related to an organization may include a group implemented by a standards organization, a vendor, a manufacturer, a distributor, a reseller, a recycler, a system integrator, an educational organization, a regulatory organization (e.g., a governmental organization), and/or the like.

Thus, in some embodiments, the function identifier 220 for a computational device function may include first information 222 (e.g., a functionality identifier) that may identify a functionality of the function (e.g., algorithm or other behavior implemented by the function) and second information 224 (e.g., a group identifier) that may indicate a group to which the function may belong (e.g., a group of functions created by a source of the function). Depending on the implementation details, such a function identifier may enable an application, a host, a device, and/or the like, to discover and/or access computational device functions in a consistent manner.

For example, in some embodiments, a standards organization may be assigned a group identifier. The standards organization may define one or more standardized computational device functions that may be identified by respective functionality identifiers. Computational devices from different sources (e.g., different vendors) may use the group identifier of the standards organization and functionality identifiers defined by the standards organization to identify functions that are implemented by the devices and are compliant with the standardized computational device functions.

As another example, in some embodiments, a source (e.g., a vendor) of a computational device may be assigned a group identifier. The source may define one or more computational device functions that may be specific to the source and may be identified by respective functionality identifiers. Additionally, or alternatively, the source may use the group identifier of the source in combination with a functionality identifier for a function defined by a standards organization to indicate a function that may be interoperable with the standardized computational device function, but which may provide additional features, benefits, and/or the like. Additionally, or alternatively, the source may use the group identifier of the source in combination with a functionality identifier for a function defined by a standards organization to override (e.g., supersede) the standardized definition and implement a noncompliant function.

Figure 3:
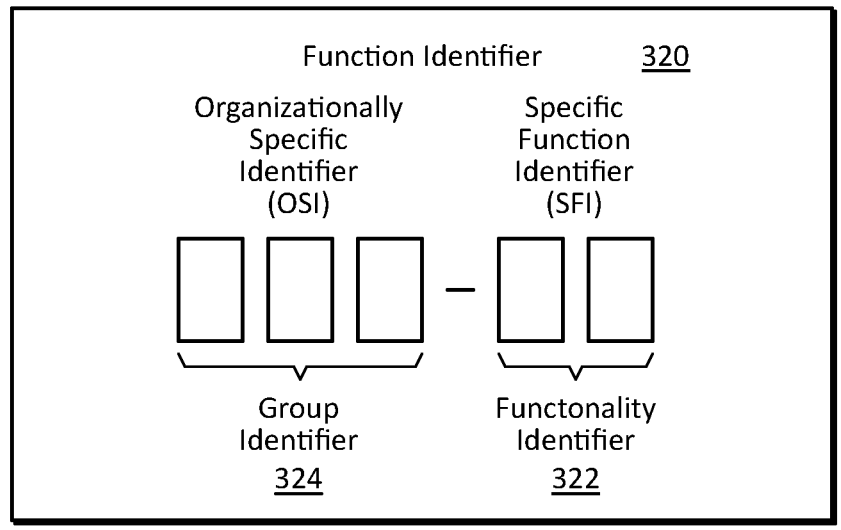
FIG. 3 illustrates an example embodiment of an identification scheme for computational device functions in accordance with example embodiments of the disclosure.

FIG. 3 illustrates an example embodiment of an identification scheme for computational device functions in accordance with example embodiments of the disclosure. For purposes of illustration, the embodiment illustrated in FIG. 3, illustrates some example implementation details (e.g., number of digits, number of bits, and/or the like) that may be used, for example, to implement the embodiment illustrated in FIG. 2. However, neither of the embodiments illustrated in FIG. 2 or FIG. 3 are limited to any of these implementation details.

Referring to FIG. 3, a function identifier 320 may include a functionality identifier 322 which may be implemented, for example, as a specific function identifier (SFI). In the example illustrated in FIG. 3, the SFI may be implemented as a two-digit code, but any other indicia may be used. The function identifier 320 may also include a group identifier 324 which may be implemented, for example, as an organizationally specific identifier (OSI). In the example illustrated in FIG. 3, the OSI may be implemented as a three-digit code, but any other indicia may be used.

In some embodiments, each digit may represent an 8-bit byte (which may also be referred to as an octet). In some embodiments, each byte may be represented with two hexadecimal characters (one hexadecimal character to represent the upper 4 bits, and one hexadecimal character to represent the lower 4 bits).

Thus, in some embodiments, the function identifier 320 may be implemented as a 5-byte (e.g., 40-bit) numeric code in which the OSI may be represented by six hexadecimal characters and the SFI may be represented by four hexadecimal characters, wherein the OSI and SFI may be separated by a hyphen for readability.

By way of example, in some embodiments, the OSI may be implemented with a three-byte (e.g. 24-bit) organizationally unique identifier (OUI) which may be maintained by the Institute of Electrical and Electronics Engineers (IEEE). In some embodiments in which a computational device may be implemented as an NVMe device, the use of an OUI for the group identifier (e.g., for an OSI) may provide a synergistic result because NVMe devices may use the same 24-bit OUI to identify a vendor of the NVMe device. However, the inventive principles are not limited to use with an OUI or any particular type of OSI.

In some embodiments, an OSI may be implemented at various levels. For example, at one level (e.g., a global or universal level), SFIs may apply globally or universally across all organizations, vendors, and/or the like). At another level (e.g., a standards level), SFIs may apply across one or more groups (e.g., vendors, resellers, systems integrators, and/or the like) that may be fully or partially compliant with a standard). At another level (e.g., a vendor level), SFIs may apply across one or more products (e.g. devices) provided by a specific vendor.

Thus, in some embodiments, the OSI 324 combined with the SFI 322 may provide a function identifier 320 that may identify (e.g., uniquely identify) one or more computational device functions. Although the example embodiment illustrated in FIG. 3 is not limited to any particular application, it may be adopted, for example, by one or more standards organizations to provide standardized identifiers, definitions, and/or the like, for computational device functions across vendors and/or other groups.

For example, in some embodiments, a reserved value of an OSI (e.g., an OSI assigned to a standards organization) may be selected to indicate a group of standardized computational device function definitions created by the standards organization. Different values of the SFI may then identify specific standardized functions defined by the standards organization. Thus, any vendor may implement any number of the standardized functions and identify any such standardized functions with a function identifier including the OSI assigned to the standards organization and the SFI assigned to the specific function by the standards organization. Depending on the implementation details, this may provide standardized computational device functions that may be common across groups (e.g., vendors) and/or may be group-neutral (e.g., vendor-neutral). In some embodiments, one or more standardized computational device functions may be implemented by a host and/or a device with hardware, software, or a combination thereof, for example, as described above with respect to the embodiment illustrated in FIG. 1.

In some embodiments, one or more computational device functions that may be identified with an OSI assigned to a standards organization and the same SFI may be implemented across one or more groups (e.g., vendors) with the same or similar expectations of input and/or output parameters and/or with interoperable results (e.g., the same or similar inputs may produce the same or similar results). However, even though different implementations may produce the same or similar results, there may be differences in performance, latencies, and/or the like depending on the different (e.g., vendor-specific) implementations.

Table 1 illustrates some example definitions of computational device functions (in this example, algorithms) that may be identified by SFIs in accordance with example embodiments of the disclosure. Referring to Table 1, the first column may be an SFI that may identify the corresponding computational device function. The second column may describe an algorithm performed by the computational device function identified by the SFI. The third column may specify the format of an interface call used to invoke the computational device function. For example, the CRC32 function identified by SFI 0001 in the first row may be named crc32, and may expect input data in an unsigned 8-bit integer (u8) format at a location pointed to by inupt_data and having a length indicated by data_length as specified by the constant size_t. The CRC32 function identified by SFI 0001 may return a value in an unsigned 32-bit integer format (u32). In some embodiments, the return value (in u32 format) may be replaced by a status in a format such as a number, a string, a true/false value, and/or the like, to indicate a status such as success, failure, and/or the like. The third column may specify one or more implementation details, applications, and/or the like, for the corresponding computational device function.

TABLE 1

| SFI (Hex) | Algorithm | Definition | Details |
| --- | --- | --- | --- |
| 0001 | crc32 | u32 crc32(u8 *input_data, size_t data_length) | Cyclic redundancy check (CRC) may detect errors in raw data. |
| 0002 | md5 | void md5(u8 *input_data, size_t data_length, u8 *digest); | MD5 message-digest algorithm may be used in cryptography to generate 128-bit hash values. |
| 0003 | sha256 | void sha256(u8 *input_data, size_t data_length, u8 *digest); | Secure hash algorithm (SHA) may provide a hash value for a given input data and may be defined under SHA-2 (Secure Hash Algorithm 2) set of cryptographic has functions. The function may provide a |

TABLE 1-continued

| SFI (Hex) | Algorithm | Definition | Details |
|---|---|---|---|
| | | | 256-bit hash as output that may be referred to as message digest. |
| 0004 | adler-32 | u32 adler32(u8 *input_data, size_t data_length) | Checksum algorithm that may return a 32-bit integer |

In some embodiments, one or more of the definitions illustrated in Table 1 may be globally specific (e.g., globally unique) and may define an algorithm (e.g., one algorithm uniquely) for the inputs, outputs, and/or results shown in Table 1. For example, the output value provided by the computational device function defined for SFI 0002h may not be the same as the output value provided by the computational device function defined for SFI 0003h because, for example, these functions operate differently even when the same input data is applied to the two different functions. However, in some embodiments, an application, host, device, and/or the like utilizing computational device functions belonging to the same OSI (e.g., the same group) and identified by the same SFI may expect the definition of usage to be the same or similar across different environments.

For purposes of illustration, the OSI having a hexadecimal value of 000000 may be assumed to be reserved for a group of globally defined computational device functions. Also for purposes of illustration, the OSI having a hexadecimal value of 000FAC may be assumed to be assigned to an example vendor. However, the inventive principles are not limited to any specific values of OSI, SFI, and/or the like.

For example, in some embodiments, if a vendor chooses to implement the globally defined crc32 function illustrated in Table 1, the vendor may use the function identifier (OSI-SFI) having the hexadecimal value 000000-0001. This value may represent the vendor's implementation of the globally defined crc32 function without vendor-specific modifications to the algorithm, and therefore, a user of the function (e.g., an application, a host, a device, and/or the like) may expect the definition to be as shown in Table 1. In some embodiments, the vendor's implementation of the globally defined crc32 function may be discoverable using the hexadecimal value of 000000-0001 for the function identifier (OSI-SFI), for example, through a discovery service as described below.

In some embodiments, a vendor may use its OSI in combination with an SFI for a globally defined computational device function to identify a function that may be interoperable with the standardized computational device function, but which may provide additional features, benefits, and/or the like. For example, a vendor may use the hexadecimal value 000FAC-0001 to identify its implementation of the globally defined crc32 function, but which may be compliant with the crc32 function shown in Table 1, but which may implement, for example, an additional optional parameter (e.g., input and/or output parameter) that may provide additional functionality.

In some embodiments, a vendor may use its OSI in combination with an SFI for a globally defined computational device function to override (e.g., supersede) the globally defined function to implement a noncompliant function. For example, a vendor may use the hexadecimal value 000FAC-0001 to identify its implementation of a crc32 function that uses input and/or output parameters that may be different from those shown in Table 1.

In some embodiments, one or more ranges of an SFI may be used to indicate one or more characteristics of the SFI. For example, in some embodiments, SFIs in the range hexadecimal range 0001-7FFF may be reserved for globally defined computational device functions, while vendors may use SFIs in the range hexadecimal range 8000-FFFF to identify vendor defined functions.

Figure 4:
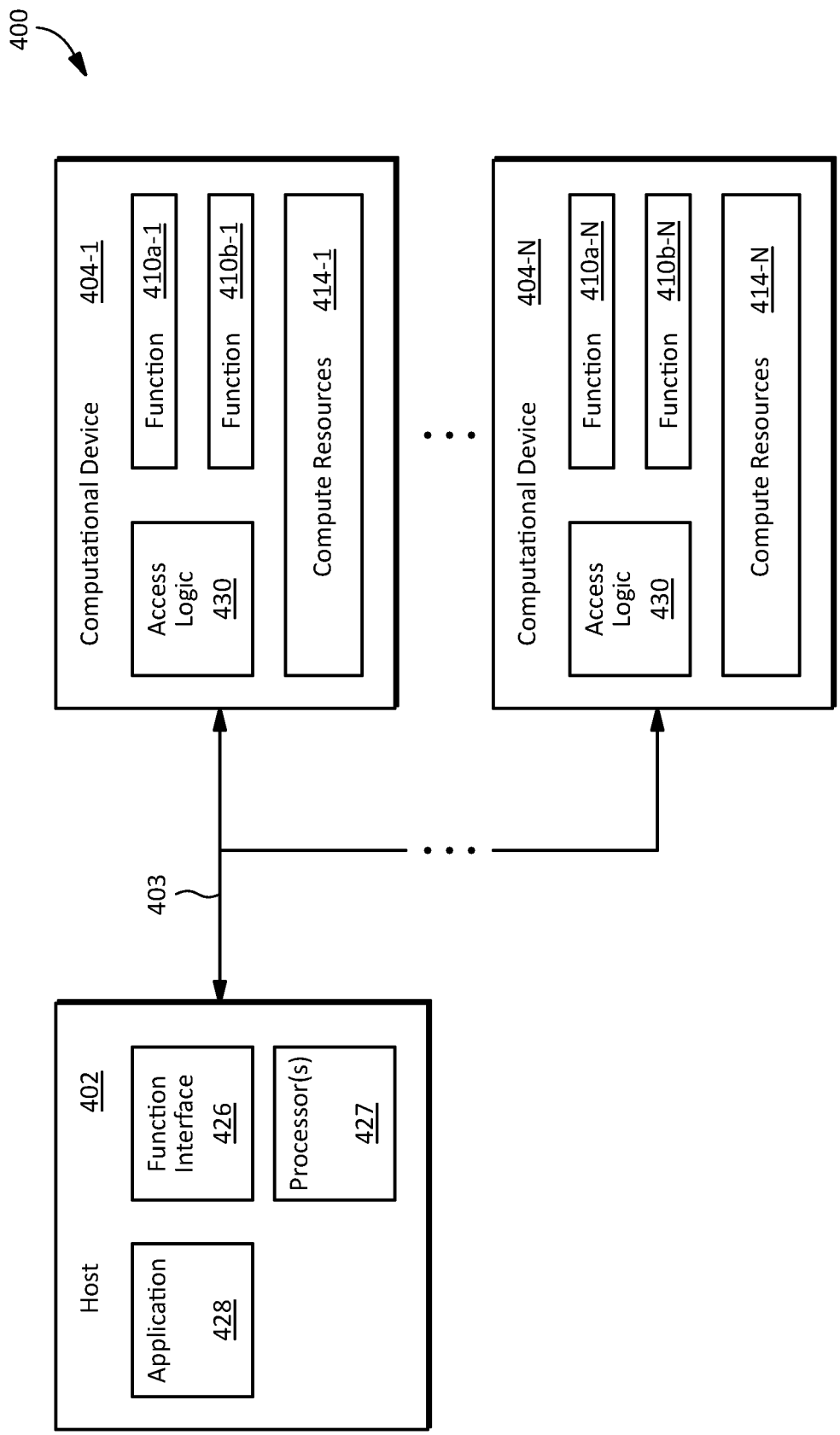
FIG. 4 illustrates an embodiment of a scheme for implementing an interface for computational device functions in accordance with example embodiments of the disclosure.

FIG. 4 illustrates an embodiment of a scheme for implementing an interface for computational device functions in accordance with example embodiments of the disclosure. The embodiment illustrated in FIG. 4 may be implemented in a system 400 that may include a host 402 and one or more computational devices 404-1, . . . , 404-N (which may be identified collectively as 404) connected through a communication fabric 403. One or more of the computational devices 404 may include one or more compute resources 414-1, . . . , 414-N (which may be identified collectively as 414) and may implement one or more computational device functions 410a-1, 410b-1, . . . , 410a-N, 410b-N (which may be identified collectively as 410). In some embodiments, any of the host 402, computational devices 404, communication fabric 403, compute resources 414, and/or computational device functions 410 may be implemented, for example, using any of the possible implementation details described above with respect to the embodiment illustrated in FIG. 1.

Referring to FIG. 4, The host 402 may include an interface 426 (which may also be referred to as a function interface) that may be used, for example, to implement any of the techniques disclosed herein relating to the use of function identifiers to advertise, discover, access, and/or the like, one or more computational device functions. In some embodiments, the interface 426 may be implemented in a manner similar to an API (e.g., by invoking one or more interface calls).

For example, in some embodiments, an application 428 running at the host 402 may invoke a call to the interface 426 to request a list of the computational devices 404 in the system 400 that may implement a functionality identified by a functionality identifier (e.g., an SFI). The interface 426 may query the one or more computational devices 404 to determine if any of the devices 404 implement the requested functionality. If any of the devices 404 implement the requested functionality, they may respond affirmatively to the query. The interface 426 may then respond to the call by returning a list (to the application 428) of the computational devices 404 that implement the requested functionality. In some embodiments, the list may include, for one or more devices in the list, a function identifier that may include both a functionality identifier (e.g., an SFI) and a group identifier (e.g., an OSI). Depending on the implementation details, this may enable the application 428 to determine if the function implemented by one of the computational devices 404 is globally defined (e.g., standardized), vendor-specific, and/or the like.

Additionally, or alternatively, in some embodiments, the application 428 may invoke a call to the interface 426 to request a list of one or more (e.g., all) computational device functions 410 that may be implemented by one or more of the computational devices (e.g., one or more specific ones of the devices 404 or all of the devices 404). The interface 426 may query the one or more computational devices 404 to obtain a list of one or more (e.g., all) computational device functions 410 that may be implemented by one or more (e.g., all) of the devices 404. In some embodiments, this mechanism may enable the one or more devices 404 to advertise the computational device functions they implement. The interface 426 may then respond to the call by returning a list (to the application 428) of one or more (e.g., all) of the computational devices 404 and one or more (e.g., all) of the computational device functions 410 implemented by each device 404. In some embodiments, the list may include, for one or more devices and/or one or more functions in the list, a function identifier that may include both a functionality identifier (e.g., an SFI) and a group identifier (e.g., an OSI).

As another example, after the application 428 has discovered one or more computational device functions 410 implemented by one or more of the computational devices 404, the application may invoke one or more calls to the interface 426, using one or more function identifiers, to configure and or execute one of the functions 410.

In some embodiments, the interface 426 may be implemented at the host 402, for example, using one or more applications, processes, services, device drivers, and/or the like, running on one or more processors such as one or more CPUs at the host 402. In some embodiments, application 428 (e.g., a user application) may run on one or more processors 427 such as one or more CPUs at the host 402. In some embodiments, the interface 426 and application 428 may run partially or entirely using one or more of the same processors 427, processes, services, device drivers, and/or the like. In some embodiments, the interface 426 and application 428 may run using separate processors, processes, services, device drivers, and/or the like.

In some embodiments, one or more of the computational devices 404 may include access logic 430-1, . . . , 430-N (which may be identified collectively as 430) which may implement one or more operations to enable the host 402, application 428, interface 426, other devices 404, and/or the like, to access one or more of the functions 410 and/or compute resources 414 in the corresponding device 404. For example, the access logic 430 may keep track of, maintain, and/or the like, the one or more functions 410 and report this information to the interface 426, for example, in response to a query, during a discovery process, during an initialization process, and/or the like. As another example, the access logic 430 may configure and/or initiate the execution of one or more of the functions 410, for example, in response to a call by the application 428 to the interface 426. For example, the access logic may invoke one of the functions 410 identified by a function identifier passed with the call, and pass one or more input parameters passed with the call to the function 410. In some embodiments, the access logic 430 may select one or more of the compute resources 414 on which to execute the function 410. The access logic 430 may also pass one or more output parameters, statuses, and/or the like from the function 410 to the interface 426. Depending on the implementation details, the function 410 may be implemented by the one or more compute resources 414 using hardware, software, or a combination thereof, as explained above with respect to the embodiment illustrated in FIG. 1.

Although the interface 426 is not limited to any specific implementation details, for purposes of illustration, an example usage of the interface 426 may proceed as follows:

(1) An application 428 running at the host 402 may intend to use a crc32 function. Thus, the application 428 may invoke a discovery interface call (which may be named csQueryFunctionList( ) for example) to the interface 426. A functionality identifier (e.g., an SFI), a function identifier (e.g., an OSI-SFI), and/or the like, may be passed as a parameter to the discovery interface call. One or more additional parameters of the discovery interface call may specify whether the query is directed to a specific device 404, or to multiple devices (e.g., all devices) 404 in the system 400. The discovery interface call may return a list of one or more devices 404 that may implement a crc32 function. In some embodiments, one or more function details may be returned along with the list.

(2) After determining the availability of one or more crc32 functions at one or more of the computational devices 404, the application 428 may create an instance of a handle for the function 410 and/or device 404 using another interface call. The application 428 may use the returned handle to execute the function 410 using by invoking an execute interface call (which may be named csQueueComputeRequest( ) for example) using the interface 426. The application may pass the parameters*input_data and data_length with the execute interface call to let the function 410 know where the input data is located.

Depending on the implementation details, with the example usage described above, text level information may be used to describe the function as in "crc32," "CyclicRedundancyCheck32," "ExecuteChecksum," and/or the like. In some embodiments, the executing function may no longer have a name and may not need to be bound to a specific library (e.g., at any time). The linkage may instead be created indirectly, e.g., through one or more calls to the interface 426. In some embodiments, the application 428 may therefore not need to take any such dependencies on a library for the invoked function 410 and may depend on a library of the interface 426. In some embodiments, some or all of the code for the actual crc32 function implementation may reside at the device 404, in host memory (in which case it may be downloaded to the device 404), or in any other location.

Although FIG. 4 illustrates one or more computational device functions 410 being implemented at the one or more devices 404, in some embodiments, and/or in some situations, one or more of the functions 410 may be implemented at the host 402. For example, in some embodiments, if the application 428 invokes an interface call requesting a list of devices 404 in the system 400 that implement a specific function as identified by a functionality identifier (e.g., an SFI), and the interface 426 determines that none of the devices 404 in the system 400 implement the requested functionality, the interface 426 may request that the host 402 implement the requested functionality, for example as a fallback provision. In such an embodiment, the host 402 may implement the requested functionality, for example, using one or more processors, processes, services, device drivers, and/or the like that may be partially or entirely the same as, or separate from, those used to implement the interface 426, run the application 428, and/or the like. In such an embodiment, the interface 426 may operate in a manner similar to that described above for a function 410 implemented by one of the devices 404, however, the information returned to the application 428 may instead identify the host 402 as the apparatus that may execute the requested computational device function instead of one of the devices 404.

Thus, the interface 426 may help the application 428 connect to a device 404 if the requested functionality is implemented at a device 404, or to hardware at the host 402 if the requested functionality is implemented at the host 402. As with one or more of the devices 404, in some embodiments, the host 402 may execute a computational device function in an execution environment such as a container, a virtual machine, an eBPF environment, and/or the like, or a combination thereof. Moreover, in some embodiments, the host 402 may include hardware configured to execute one or more computational device functions partially or entirely in hardware, for example, in a manner similar to the hardware implemented functions 118 described above with respect to FIG. 1.

Referring to FIG. 4, although the interface 426 is illustrated as being implemented at the host 402, in some embodiments, the interface 426 may be implemented partially or entirely at one or more of the computational devices 404, or at any other location.

Figure 5:
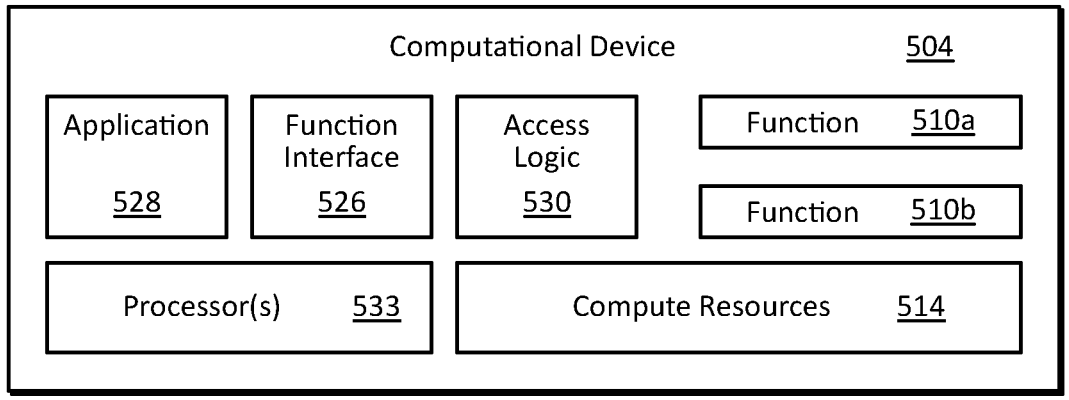
FIG. 5 illustrates an embodiment of a computational device having a function interface in accordance with example embodiments of the disclosure.

FIG. 5 illustrates an embodiment of a computational device having a function interface in accordance with example embodiments of the disclosure. The computational device 504 illustrated in FIG. 5 may include one or more compute resources 514 that may execute and/or implement one or more computational device functions 510a and/or 510b, and/or access logic 530, one or more of which may operate in a manner similar to those described above with respect to the embodiment illustrated in FIG. 4. However, the computational device 504 illustrated in FIG. 5 may further include an interface 526 (which may also be referred to as a function interface). To the extent applicable, the interface 526 may operate in a manner similar to the interface 426 at host 402. However, the interface 526 may operate partially or entirely on one or more processors 533, processes, services, device drivers, and/or the like at the device 504. In some embodiments, the one or more processors 533 may be separate from and/or share resources with, the compute resources 514.

The interface 526 may enable an application, host, device, and/or the like to advertise, discover and/or access one or more computational device functions 510a and/or 510b, for example, by invoking an interface call using a function identifier for the computational device function. In some embodiments, the interface 526 may interact with an application at a remote host (e.g., application 428 at host 402 illustrated in FIG. 4). Additionally, or alternatively, the interface 526 may interact with an application 528 that may run at the computational device 504 (e.g., the one or more processors 533).

In some embodiments, the computational device 504 may implement an execution environment on the device 504 that may be similar to that running on the host 402 illustrated in FIG. 4. For example, the device 504 may implement an embedded operating system such as Linux with a subsystem and tailored application running a stack similar to one that may run on the host 402. In such an embodiment, one or more microservices from the host 402 may be ported from the host 402 to the device 504. Depending on the implementation details, this may enable the device 504 to port the interface 526 and/or application 528 with relatively minimal changes.

In some embodiments, one or more function discovery features disclosed herein may be implemented using a discovery service that may be implemented partially or entirely with an interface (e.g., interface 426 and/or 526) or may be implemented as a separate service. For example, in some embodiments, a discovery service may be implemented partially or entirely with an application, a process, a service, a device driver, and/or the like at a host, a device, or a combination thereof. In some embodiments, a service may run within a specific environment (e.g., a system such as the system 400 illustrated in FIG. 4) and may check the environment to create an inventory of available computational device functionalities (identified by one or more function identifiers and/or portions thereof), and/or determine if a requested functionality is available at a host, one or more devices, and/or the like. In some embodiments, if a discovery service determines that a requested functionality is not available in a local environment, the discovery service may expand the search to a broader environment (e.g., an Internet space). In some embodiments, a function discovery service that takes a function identifier (e.g., a OUI-SFI) as an input may provide details of where the requested functionality resides in the system. In some embodiments, a function identification service may be configured to identify a requested computational device function based on a full or partial string expression e.g., "crc32" that may be provided as an input to the service. In some embodiments, one or more computational device functions may be discovered, for example, using a specific NVMe log page for NVMe devices. In some embodiments, one or more standards organizations may adopt one or more definitions to advertise the existence of one or more computational device functions based on one or more device identifiers (e.g., OUI-SFIs). In some embodiments, a discovery service and/or one or more interface libraries may query a device to obtain one or more details of one or more computational device functions implemented by the device.

In some embodiments, the computational device 504 may implement the one or more computational device functions 510a and/or 510b with software (e.g., using an embedded operating system), with hardware, and/or a combination thereof. In such an embodiment, the device 504 may advertise the one or more computational device functions 510a and/or 510b using a function identifier (e.g., a OUI-SFI). A discovery service and/or one or more interface libraries may understand the distinction between software and/or hardware implementations and may query the device to obtain these implementation details. Moreover, the interface 526 may help configure and/or execute one or more of the computational device functions 510a and/or 510b within the device 504.

Any of the functionality disclosed herein, including, for example, any of the interfaces 426 and 526, access logic 430 and 530, and/or the like, or any of the functionality implemented at a host, a computational device, and/or the like, may be implemented with hardware, software, firmware, or any combination thereof including combinational logic, sequential logic, one or more timers, counters, registers, and/or state machines, one or more complex programmable logic devices CPLDs, FPGAs, ASICs, CPUs, GPUs, NPUs, TPUs, and/or the like, executing instructions stored in any type of memory, or any combination thereof. In some embodiments, one or more components may be implemented as a system-on-chip (SOC).

Figure 6:
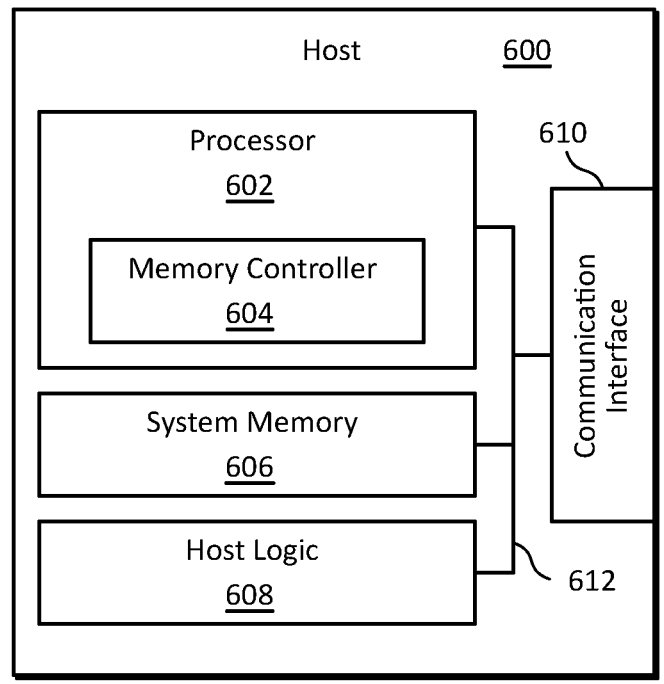
FIG. 6 illustrates an example embodiment of a host apparatus in accordance with example embodiments of the disclosure.

FIG. 6 illustrates an example embodiment of a host apparatus in accordance with example embodiments of the disclosure. The host apparatus illustrated in FIG. 6 may be used, for example, to implement any of the hosts disclosed herein. The host apparatus 600 illustrated in FIG. 6 may include a processor 602, which may include a memory controller 604, a system memory 606, host logic 608, and/or a communication interface 610. Any or all of the components illustrated in FIG. 6 may communicate through one or more system buses 612. In some embodiments, one or more of the components illustrated in FIG. 6 may be implemented using other components. For example, in some embodiments, the host control logic 608 may be implemented by the processor 602 executing instructions stored in the system memory 606 or other memory. In some embodiments, the host logic 608 may implement any of the host functionality disclosed herein including, availing the host 600 and/or an application running thereon, of a computational device function identification scheme as disclosed herein.

Figure 7:
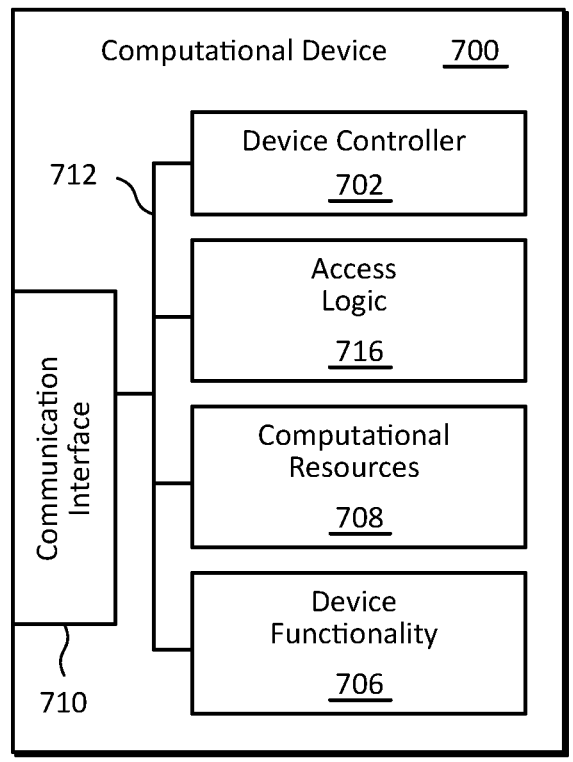
FIG. 7 illustrates an example embodiment of a computational device that may be used to provide a user with access to one or more computational resources through a programming interface in accordance with example embodiments of the disclosure.

FIG. 7 illustrates an example embodiment of a computational device that may be used to provide a user with access to one or more computational resources through a programming interface in accordance with example embodiments of the disclosure. The embodiment 700 illustrated in FIG. 7 may be used, for example, to implement any of the computational devices disclosed herein. The computational device 700 may include a device controller 702, one or more computational resources 708, access logic 716, a device functionality circuit 706, and a communication interface 710. The components illustrated in FIG. 7 may communicate through one or more device buses 712. In some embodiments, the device controller 702 and/or one or more computational resources 708 may include all or a portion of the data memory 109 illustrated in FIG. 1.

The device functionality circuit 706 may include any hardware to implement the primary function of the device 700. For example, if the device 700 is implemented as a storage device, the device functionality circuit 706 may include a storage medium such as one or more flash memory devices, an FTL, and/or the like. As another example, if the device 700 is implemented as a network interface card (NIC), the device functionality circuit 706 may include one or more modems, network interfaces, physical layers (PHYs), medium access control layers (MACS), and/or the like. As a further example, if the device 700 is implemented as an accelerator, the device functionality circuit 706 may include one or more accelerator circuits, memory circuits, and/or the like. In some embodiments, the device functionality circuit 706 may include all or a portion of the data memory 109 illustrated in FIG. 1.

Figure 8:
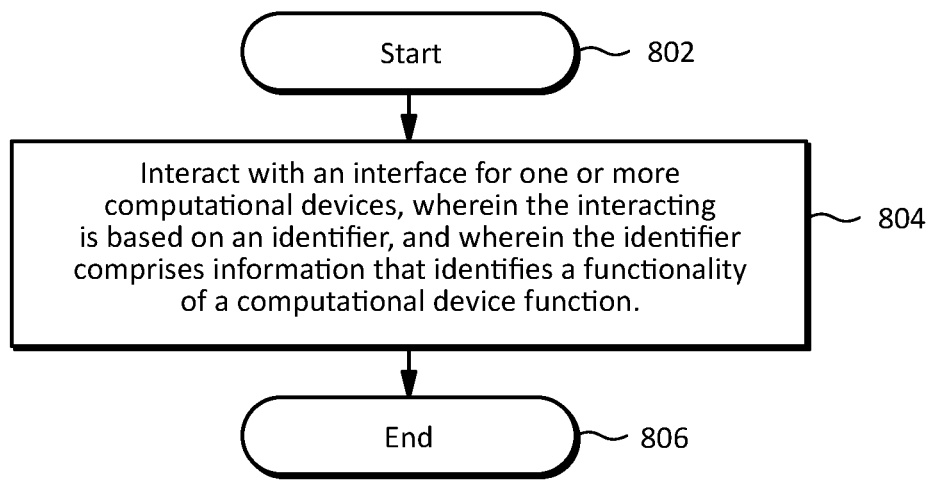
FIG. 8 illustrates an embodiment of a method identifying a computational device function in accordance with example embodiments of the disclosure.

FIG. 8 illustrates an embodiment of a method identifying a computational device function in accordance with example embodiments of the disclosure. The method may begin at operation 802. At operation 804, the method may interact with an interface for one or more computational devices, wherein the interacting is based on an identifier, and wherein the identifier comprises information that identifies a functionality of a computational device function. For example, interacting may refer to discovering a computational device function, accessing (e.g., configuring and/or executing) a computational device function, and/or the like. In some embodiments, wherein the identifier may further include information that identifies a group of the computational device function. In some embodiments, the information that identifies the functionality of the computational device function may be implemented with a functionality identifier; and the information that identifies the group of the computational device function may be implemented with a group identifier. The method may end at operation 806.

The embodiments illustrated in FIG. 8, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner. The various details and embodiments described above may be combined to produce additional embodiments according to the inventive principles of this patent disclosure.

Since the inventive principles of this patent disclosure may be modified in arrangement and detail without departing from the inventive concepts, such changes and modifications are considered to fall within the scope of the following claims.

The invention claimed is:

1. A method comprising:
   interacting with an interface for one or more computational devices, wherein the interface uses at least one processing circuit;
   wherein the interacting is based on a first identifier and a second identifier;
   wherein the first identifier comprises first information that identifies a first functionality of a first computational device program, and the second identifier comprises second information that identifies a second functionality of a second computational device program; and
   wherein the interacting comprises:
   receiving, at the one or more computational devices, from an apparatus, the first identifier;
   executing, based on the receiving the first identifier, the first computational device program; and receiving, at the one or more computational devices, from the apparatus, the second identifier.

2. The method of claim 1, wherein the first information comprises a functionality identifier.

3. The method of claim 1, wherein the first identifier further comprises information that identifies a group of the first computational device program.

4. The method of claim 3, wherein the group of the first computational device program is based on a source of the first computational device program.

5. The method of claim 3, wherein:
the first information that identifies the first functionality of the first computational device program comprises a first functionality identifier;
the first information that identifies the group of the first computational device program comprises a first group identifier;
the second information comprises a second functionality identifier and a second group identifier;
the first functionality identifier is the same as the second functionality identifier;
the first group identifier is different from the second group identifier; and
the first functionality is interoperable with the second functionality.

6. The method of claim 1, wherein the interacting comprises requesting requested information using the interface.

7. The method of claim 6, further comprising providing, by the interface, based on the requesting, the requested information.

8. The method of claim 6, wherein the requested information comprises an indication that one or more of the one or more computational devices is capable of executing the first computational device program.

9. The method of claim 8, wherein the indication comprises a list of computational devices that are capable of executing the first computational device program.

10. The method of claim 6, wherein the requested information comprises a list of computational device programs capable of being executed by at least one of the one or more computational devices.

11. The method of claim 6, wherein the requested information comprises a format of the first computational device program.

12. The method of claim 11, wherein the format comprises one or more parameters.

13. The method of claim 6, wherein the requesting comprises invoking an interface call.

14. The method of claim 1, wherein the interacting comprises accessing, based on the first identifier, using the interface, the first computational device program.

15. The method of claim 14, wherein the accessing comprises configuring the first computational device program.

16. The method of claim 1, wherein the executing the first computational device program is performed, at least partially, with hardware.

17. A device comprising:
one or more computational resources capable of performing a first computational device program and a second computational device program; and
at least one processing circuit capable of configuring, based on a first identifier, the first computational device program, and configuring, based on a second identifier, the second computational device program;
wherein the first identifier comprises first information that identifies a first functionality of the first computational device program, and the second identifier comprises second information that identifies a second functionality of the second computational device program; and
wherein the at least one processing circuit is configured to receive, from an apparatus, the first identifier, and receive, from the apparatus, the second identifier.

18. The device of claim 17, wherein the device comprises a computational storage device.

19. A system comprising:
an apparatus comprising at least one processing circuit configured to provide an interface for one or more computational devices;
wherein the interface is configured to perform at least one first operation based on a first identifier and at least one second operation based on a second identifier;
wherein the first identifier identifies a first functionality of a first computational device program and the second identifier identifies a second functionality of a second computational device program;
wherein the at least one first operation provides first information about the first functionality of the first computational device program and the at least one second operation provides second information about the second functionality of the second computational device program; and
wherein the interface is configured to send, to the one or more computational devices, the first identifier and the second identifier.

20. The system of claim 19, wherein the apparatus is configured to execute an application configured to interact with the interface.

* * * * *